United States Patent [19]
Koura et al.

[11] Patent Number: 5,381,827
[45] Date of Patent: Jan. 17, 1995

[54] GAS DISTRIBUTOR FOR USE IN GAS PHASE POLYMERIZATION APPARATUS

[75] Inventors: Hiroyuki Koura; Yoshizumi Sasaki, both of Ichihara; Kazuki Wakamatsu, Sodegaura; Kazuyuki Takemura, Ichihara, all of Japan

[73] Assignee: Sumitomo Chemical Company, Limited, Osaka, Japan

[21] Appl. No.: 157,294

[22] Filed: Nov. 26, 1993

[30] Foreign Application Priority Data

Nov. 30, 1992 [JP] Japan .................................. 4-319698

[51] Int. Cl.⁶ .................. B01J 8/20; C08F 2/34
[52] U.S. Cl. .................. 137/561 A; 422/135; 422/143; 422/311; 432/58
[58] Field of Search .................. 137/561 A; 422/135, 422/143, 311; 432/58

[56] References Cited

U.S. PATENT DOCUMENTS

| | | | |
|---|---|---|---|
| 4,521,378 | 6/1985 | Ichimura et al. | 422/135 |
| 4,877,587 | 10/1989 | Rhee et al. | 422/135 |
| 5,296,265 | 3/1994 | Okuma et al. | 422/143 |

Primary Examiner—John Rivell
Attorney, Agent, or Firm—Sughrue, Mion, Zinn, Macpeak & Seas

[57] ABSTRACT

For use in gas phase polymerization apparatus having an agitator in a fluidized bed polymerization reactor, the present invention provides a gas distributor which has holes, and caps covering the respective holes from above and each having an opening oriented in a substantially horizontal direction at an angle of about 90 to about 135 deg with, and outwardly of, a tangent to a circle centered about the center of the reactor whereby an increase in the gas solid ratio can be prevented in the region above the distributor to ensure efficient discharge of the polymer produced, and the polymer particles can be prevented from falling into a gas room thereunder.

6 Claims, 2 Drawing Sheets

GAS DISTRIBUTOR FOR USE IN GAS PHASE POLYMERIZATION APPARATUS

FIELD OF THE INVENTION

The present invention relates to gas distributors for use in gas phase polymerization apparatus having an agitator in a fluidized bed polymerization reactor.

BACKGROUND OF THE INVENTION

Great improvements achieved in recent years in the properties of catalysts for polymerizing olefins have remarkably increased the polymer yield per unit amount of the catalyst used, consequently reducing the amount of transition metal catalyst remaining in the polymer produced and eliminating the need for the step of removing the catalyst.

While the processes for polymerizing olefins include the slurry polymerization process, bulk polymerization process, gas phase polymerization process and the like, elimination of the catalyst removing step has directed attention to the gas phase polymerization process in which recovery of the solvent and the purification step can be dispensed with and which readily permits recovery of the monomer and drying of the polymer product.

To smoothly effect such gas phase polymerization, generally used are fluidized bed reactors or this type of reactors having an agitator, in which an olefin or olefin-containing gas is subjected to polymerization while fluidizing solid particles including olefin polymer particles and catalyst particles in suspension in a fluidized bed forming region within the reactor. The reactor is operated by continuously supplying the material, catalyst and polymerization gas and continuously discharging the polymer product.

FIG. 1 shows a typical example of gas phase polymerization apparatus having an agitator in a fluidized bed polymerization reactor. The apparatus comprises a polymerization reactor 1, gas distributor 2 incorporated into the reactor, gas room 3 separated off by the distributor 2 and positioned thereunder, fluidized bed 4 formed by a catalyst and a polymer product above the distributor 2, polymerization catalyst supply channel 5, polymer product discharging channel 6, circulation gas inlet 7 communicating with the gas room, circulation gas outlet 8 communicating with the fluidized bed forming region, replenishing material feed channel 9 and circulation gas compressor 10. The agitator used is a usual agitating device having anchor blades, turbine blades, flat plate blades or like blades (not shown).

Unexamined Japanese Patent Publication SHO 58-154702 discloses use of a gas distributor in the gas phase polymerization reactor of the type described for polymerizing olefins which distributor has holes and caps covering the respective holes from above and each having an opening in one direction in order to prevent the distributor from clogging and prevent particles of polymer product from falling into the gas room.

However, the above gas distributor encounters a problem if it is attempted to increase the polymerization capacity of the reactor because in the region above the distributor and thus the region in the discharging channel 6, the gas solid ratio (gas (kg) per unit volume/solid (kg) per unit volume) increases, that is, the amount of gas to be discharged from the fluidized bed increases to result in a reduced efficiency in discharging the polymer product from the fluidized bed.

OBJECT OF THE INVENTION

The main object of the present invention is to overcome the above drawback experienced with the gas distributor for use in gas phase polymerization apparatus having an agitator in a fluidized bed reactor and to provide a gas distributor which is adapted for efficient discharge of the polymer produced.

DETAILED DESCRIPTION

For use in gas phase polymerization apparatus of the type described, we have conducted research on gas distributors which have holes and caps covering the respective holes from above and each having an opening in one direction, and found that when the direction of the opening is within a specified range of angles, it is possible to prevent the reduction in the polymer product discharging efficiency due to an increase in the gas solid ratio in the region above the distributor and to prevent polymer particles from falling into the gas room, whereby the present invention has been accomplished.

More specifically, the present invention provides a gas distributor for use in a gas phase polymerization apparatus having an agitator in a fluidized bed polymerization reactor, the gas distributor being characterized in that the distributor has holes each covered with a cap from above, the cap having an opening oriented in a substantially horizontal direction at an angle of about 90 to about 135 deg with, and outwardly of, a tangent to a circle centered about the center of the reactor.

EMBODIMENT

The present invention will be described in greater detail with reference to an embodiment shown in the accompanying drawings. The invention is not limited to the embodiment but can be modified within the scope as defined in the appended claims.

Figure 1:
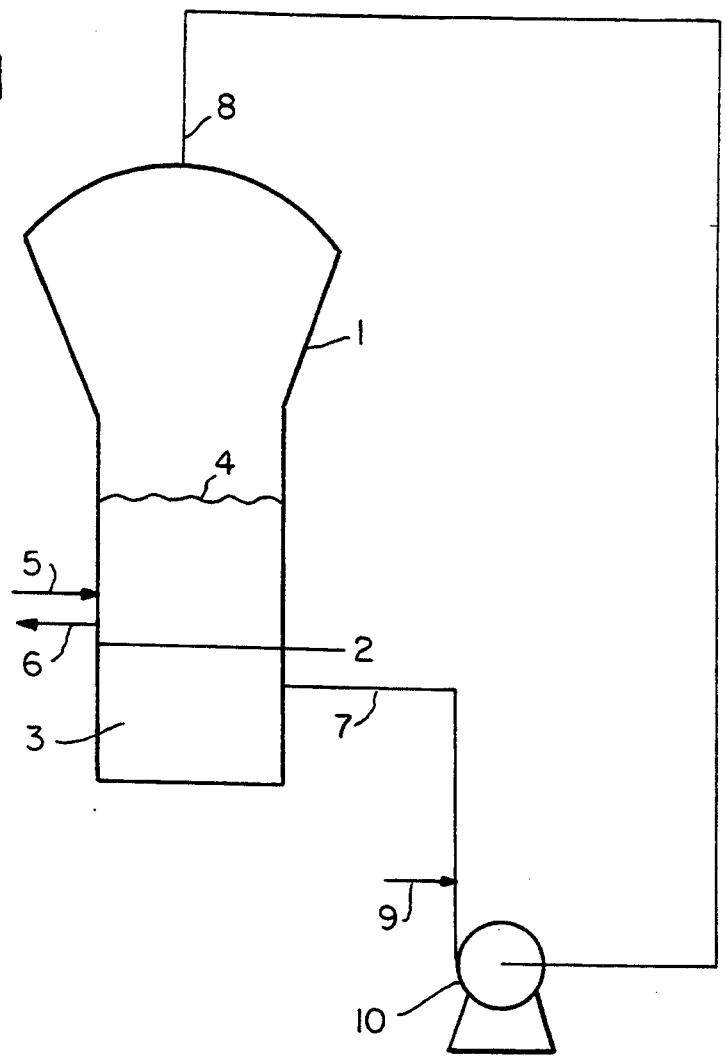
FIG. 1 is a view schematically showing the construction of a gas phase polymerization apparatus.
Figure 2:
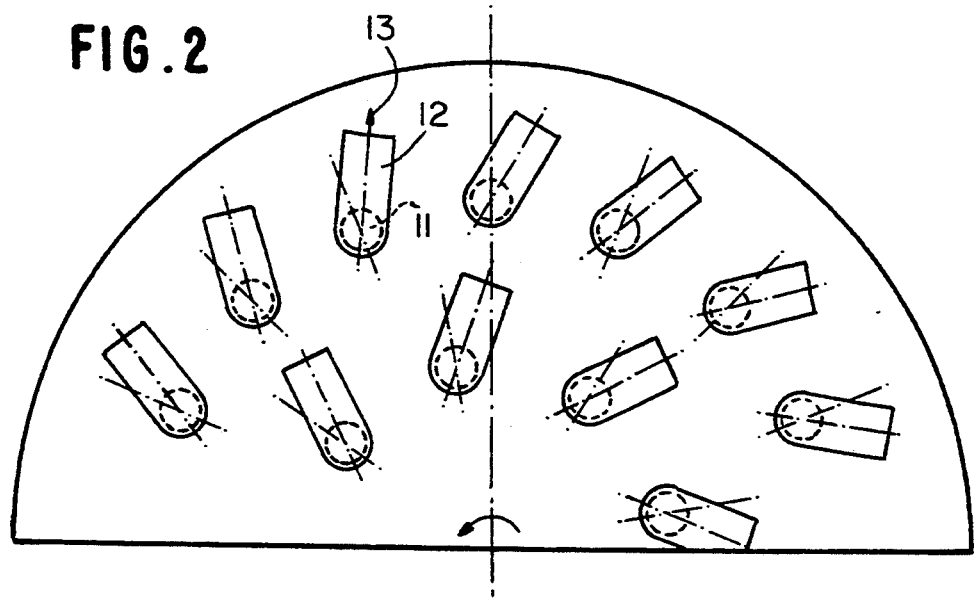
FIG. 2 is a plan view showing a gas distributor embodying the invention for use in gas phase polymerization apparatus.
Figure 3A:
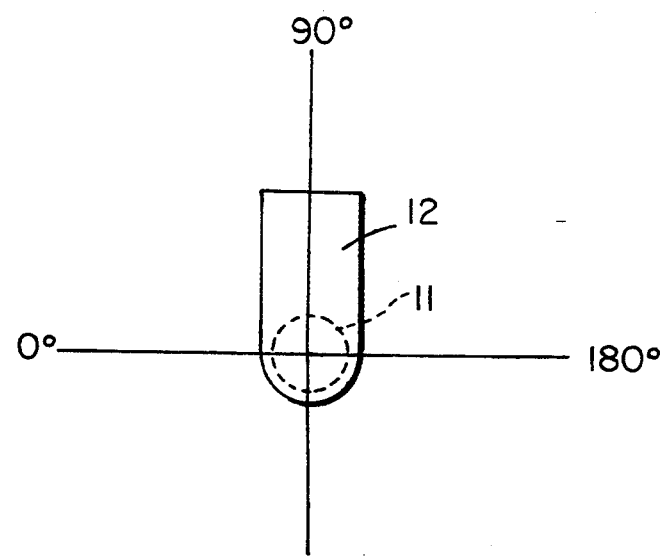
FIGS. 3A and 3B are enlarged fragmentary views of a hole in the distributor and a cap for illustrating the direction in which the cap is open.
Figure 3B:
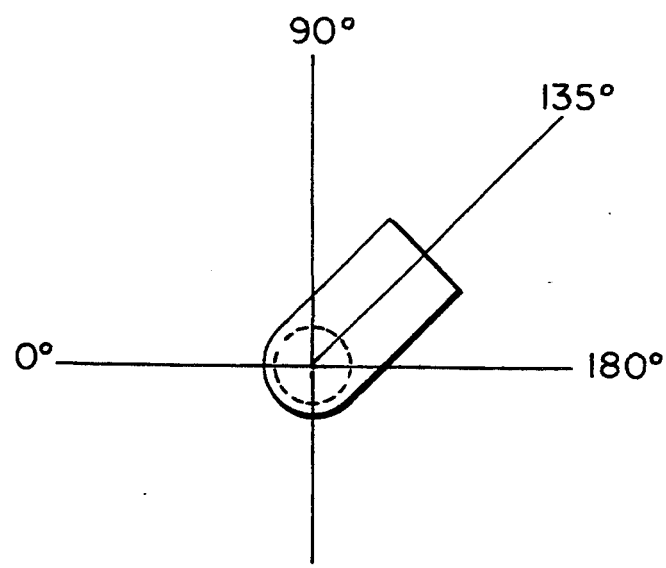
Figure 4:
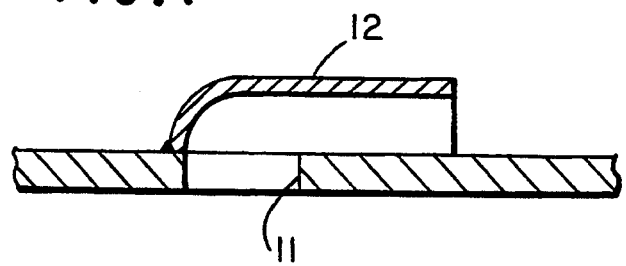
FIG. 4 is a view in vertical section showing the construction of the hole and the cap.

FIG. 2 shows a gas distributor embodying the present invention.

The distributor has holes 11 which are arranged suitably in accordance with the purpose for which the distributor is used. The holes are arranged, for example, on concentric circles centered about the center of the distributor, in a staggered pattern or in a lattice pattern. The diameter of the holes, which is determined also suitably, is usually about 10 to about 30 mm.

Caps 12 are attached to the distributor to cover the respective holes 11 from above and each have an opening 13 which is oriented in a substantially horizontal direction at an angle (opening angle) of about 90 to about 135 deg with, and outwardly of, a tangent to a circle centered about the center of the reactor in which the distributor is used. The opening angle is preferably about 90 to about 120 deg, more preferably about 90 to about 100 deg. If the opening angle is less than 90 deg, the gas solid ratio in the region above the distributor increases, leading to an impaired polymer product discharging efficiency. If the angle is greater than 135 deg, the polymer product is likely to fall into the gas room 3.

The external form of the cap is not limited specifically insofar as the cap is so designed as to permit a smooth flow of fluid in the vicinity of the distributor. For example, the cap can be of a tapered or streamlined contour in vertical section. The opening of the cap is oriented in a substantially horizontal direction with respect to the distributor. The opening has an area which is usually equal to the area of the hole to about ⅓ of the hole area.

The opening ratio of the distributor afforded by the caps 12, namely, the ratio of the combined area of the openings of all the caps 12 to the entire area of the distributor is usually 1 to 3.5%, preferably 1.5 to 3%, although variable according to the purpose.

The caps 12 can be attached to the distributor, for example, by welding or with screws or the like, preferably by welding.

The gas distributor of the present invention is used in gas phase polymerization apparatus which have an agitator in a fluidized bed polymerization reactor. Such apparatus are suitable for polymerizing olefins, for example, ethylene, propylene and the like.

The gas phase polymerization apparatus of the above-mentioned type equipped with the gas distributor of the present invention is operated for polymerization under conditions which are suitably determined depending on the polymer to be produced. For example, the internal pressure of the polymerization reactor is usually 10 to 30 k/cm$^2$ G, the reaction temperature is usually 50 to 90° C., and the gas flow rate (the value obtained by dividing the amount of gas supplied through the distributor by the cross sectional area of the reactor) is usually 10 to 50 cm/sec.

The use of the apparatus of the type mentioned and equipped with the gas distributor of the present invention for gas phase polymerization makes it possible to discharge the polymer product from the reactor efficiently without permitting the product to fall into the gas room and without a reduction in the gas solid ratio in the region above the distributor that would impair the discharging efficiency.

EXAMPLE 1

Propylene was polymerized using an apparatus comprising a reactor which had an agitator and a gas distributor installed therein. The gas distributor had holes, and caps covering the respective holes and each having a streamlined contour in vertical section and a gas ejection opening oriented in a substantially horizontal direction at an angle of 90 deg with, and outwardly of, a tangent to a circle centered about the center of the reactor. The polymerization was conducted at an internal pressure of 18 kg/cm$^2$ G, a temperature of 75° C. and a gas flow rate of 15 cm/sec or 18 cm/sec. After stabilization of the polymerization system, the amount of gas withdrawn was measured to determine the gas solid ratio. The amount of gas withdrawn was measured by connecting the gas outlet of the reactor to a container and measuring the rise in the internal pressure of the container and the amount of power discharged during the withdrawal, followed by calculation. The pressure difference between the container and the reactor was set at 18 kg/cm$^2$. The polymer produced was 0.420 in bulk density, and the gas solid ratio was 0.126 at the gas flow rate of 15 cm/sec or 0.130 at the gas flow rate of 18 cm/sec. After the determination of the gas solid ratio, the polymerization was stopped, and the gas room under the distributor was checked for a fall of the polymer product to find no fallen polymer in the gas room. The polymer was drawn off efficiently.

EXAMPLE 2

Propylene was polymerized using an apparatus comprising a reactor which had an agitator and a gas distributor installed therein. The gas distributor had holes, and caps covering the respective holes and each having a streamlined contour in vertical section and a gas ejection opening oriented in a substantially horizontal direction at an angle of 100 deg with, and outwardly of, a tangent to a circle centered about the center of the reactor. The polymerization was conducted at an internal pressure of 18 kg/cm$^2$ G, a temperature of 75° C. and a gas flow rate of 15 cm/sec or 18 cm/sec. After stabilization of the polymerization system, the amount of gas withdrawn was measured to determine the gas solid ratio in the same manner as above. The pressure difference between the container and the reactor was set at 18 kg/cm$^2$ The polymer obtained was 0.420 in bulk density, and the gas solid ratio was 0.123 at the gas flow rate of 15 cm/sec or 0.130 at the gas flow rate of 18 cm/sec. After the determination of the gas solid ratio, the polymerization was stopped, and the gas room under the distributor was checked for a fall of the polymer product to find no fallen polymer in the gas room. The polymer was drawn off efficiently.

Comparative Example 1

Propylene was polymerized using an apparatus comprising a reactor which had an agitator and a gas distributor installed therein. The gas distributor had holes, and caps covering the respective holes and each having a streamlined contour in vertical section and an opening. The direction of the gas ejection openings of the caps was substantially horizontal and at an angle of up to ±20 deg with a tangent to a circle centered about the center of the reactor. The polymerization was conducted at an internal pressure of 18 kg/cm$^2$ G, a temperature of 75° C. and a gas flow rate of 19.3 cm/sec. After stabilization of the polymerization system, the amount of gas withdrawn was measured to determine the gas solid ratio in the same manner as above. The pressure difference between the container and the reactor was set to 9 kg/cm$^2$ The polymer produced was 0.420 in bulk density and 0.190 in the gas solid ratio.

We claim:

1. A gas distributor for use in a gas phase polymerization apparatus having an agitator in a fluidized bed polymerization reactor, the gas distributor being characterized in that the distributor has holes each covered with a cap from above, the cap having an opening oriented in a substantially horizontal direction at an angle of about 90 to about 135 deg with, and outwardly of, a tangent to a circle centered about the center of the reactor.

2. A gas distributor as defined in claim 1 for use in a gas phase polymerization apparatus for an olefin.

3. A gas distributor as defined in claim 2 wherein the olefin is ethylene or propylene.

4. A gas distributor as defined in claim 1 wherein the direction of the opening is at an angle of about 90 to about 120 deg with the tangent.

5. A gas distributor as defined in claim 1 wherein the direction of the opening is at an angle of about 90 to about 100 deg with the tangent.

6. A gas distributor as defined in claim 1 wherein the cap has a tapered or streamlined contour in vertical section.

* * * * *